US011646770B2

(12) United States Patent
Rusek et al.

(10) Patent No.: US 11,646,770 B2
(45) Date of Patent: May 9, 2023

(54) METHOD AND APPARATUS FOR MILLIMETER-WAVE MIMO MODE SELECTION (71) Applicant: Sony Group Corporation, Tokyo (JP)

(72) Inventors: Fredrik Rusek, Lund (SE); Zuleita Ho, Lund (SE); Olof Zander, Lund (SE); Erik Bengtsson, Lund (SE)

(73) Assignee: Sony Group Corporation, Tokyo (JP)

( * ) Notice: Subject to any disclaimer, the term of this patent is extended or adjusted under 35 U.S.C. 154(b) by 147 days.

(21) Appl. No.: 17/045,077

(22) PCT Filed: Mar. 27, 2019

(86) PCT No.: PCT/US2019/024264
§ 371 (c)(1),
(2) Date: Oct. 2, 2020

(87) PCT Pub. No.: WO2019/195047
PCT Pub. Date: Oct. 10, 2019

(65) Prior Publication Data
US 2021/0152219 A1 May 20, 2021

(30) Foreign Application Priority Data
Apr. 5, 2018 (SE) .................... 1830115-0

(51) Int. Cl.
*H04B 7/0413* (2017.01)
*H04B 7/10* (2017.01)
(Continued)

(52) U.S. Cl.
CPC ......... *H04B 7/0413* (2013.01); *H04B 7/0408* (2013.01); *H04B 7/10* (2013.01); *H04W 72/044* (2013.01)

(58) Field of Classification Search
None
See application file for complete search history.

(56) References Cited

U.S. PATENT DOCUMENTS 8,165,048 B2 * 4/2012 Imaeda ............... H04B 7/0617
370/310
9,362,994 B2 * 6/2016 Seol ..................... H04B 7/0456
(Continued)

FOREIGN PATENT DOCUMENTS

CN    101946420 A    1/2011
EP    1973238 A1    9/2008
(Continued)

OTHER PUBLICATIONS

"Beam Management for NR", Qualcomm, Nagoya, P.R. Japan, Sep. 2017, 3GPP TSG-RAN WG1 #90, R1-1716396, 6 pages.
(Continued)

*Primary Examiner* — Gregory B Sefcheck
(74) *Attorney, Agent, or Firm* — Tucker Ellis LLP (57) ABSTRACT

Systems and methods for selecting a communication mode in a wireless network (10) include a communication mode selection procedure that may be carried out by the respective devices in an automated manner to identify a desired mode for communication between an electronic device (14) and a network node (12). Determining the desired mode for communication is based on the electronic device's (14) capabilities and/or the channel conditions of the communication channel between the electronic device (14) and the network node (12). The procedures described herein may allow for the high data rates associated with polarization based MIMO (P-MIMO) in capably equipped electronic devices (14) while preventing communication interruptions due to unfavorable channel conditions.

20 Claims, 5 Drawing Sheets

(51) Int. Cl.
*H04W 72/04* (2009.01)
*H04B 7/0408* (2017.01)
*H04W 72/044* (2023.01)

(56) References Cited

U.S. PATENT DOCUMENTS

| | | | |
|---|---|---|---|
| 10,050,681 B2 * | 8/2018 | Kim | H04B 7/0691 |
| 10,136,456 B2 * | 11/2018 | Song | H04W 76/25 |
| 10,362,589 B2 * | 7/2019 | Kim | H04W 72/048 |
| 10,425,144 B2 * | 9/2019 | Raghavan | H04B 7/088 |
| 10,622,715 B2 * | 4/2020 | Athley | H04B 7/10 |
| 10,749,586 B2 * | 8/2020 | Mizusawa | H04B 7/10 |
| 10,855,350 B2 * | 12/2020 | Oteri | H04B 7/0639 |
| 11,024,962 B2 * | 6/2021 | Athley | H01Q 1/246 |
| 11,082,118 B2 * | 8/2021 | Raghavan | H04B 7/0617 |
| 11,082,874 B2 * | 8/2021 | Kim | H04W 76/27 |
| 11,165,476 B2 * | 11/2021 | Oteri | H04B 7/0617 |
| 2007/0243826 A1 * | 10/2007 | Liu | H04B 17/3911 455/67.11 |
| 2009/0207093 A1 | 8/2009 | Anreddy et al. | |
| 2011/0085448 A1 * | 4/2011 | Kuwahara | H04W 16/10 370/242 |
| 2011/0105049 A1 * | 5/2011 | Yamada | H04B 7/0697 455/68 |
| 2014/0099884 A1 * | 4/2014 | Lozano | H04M 15/81 455/12.1 |
| 2015/0365141 A1 * | 12/2015 | Derneryd | H04B 7/0408 455/63.4 |
| 2016/0365900 A1 * | 12/2016 | Kim | H04B 7/088 |
| 2017/0093476 A1 * | 3/2017 | Zhang | H04B 7/0617 |
| 2018/0026367 A1 * | 1/2018 | Athley | H04B 7/10 342/373 |
| 2018/0063693 A1 | 3/2018 | Chakraborty et al. | |
| 2018/0102826 A1 * | 4/2018 | Raghavan | H04B 7/0617 |
| 2018/0227928 A1 * | 8/2018 | Kim | H04W 72/085 |
| 2019/0068258 A1 * | 2/2019 | Oteri | H04B 7/043 |
| 2019/0238201 A1 * | 8/2019 | Nilsson | H04B 7/088 |
| 2020/0120528 A1 * | 4/2020 | Gao | H04L 5/0048 |
| 2021/0028839 A1 * | 1/2021 | Oteri | H04B 7/0617 |

FOREIGN PATENT DOCUMENTS

| | | | |
|---|---|---|---|
| JP | 2011514748 A | | 5/2011 |
| JP | 2018532311 A | | 11/2018 |
| JP | 2019514296 A | | 5/2019 |
| JP | 2019527514 A | | 9/2019 |
| JP | 2021013171 A | | 2/2021 |
| WO | 2016080742 A1 | | 5/2016 |
| WO | 2017048487 A1 | | 3/2017 |
| WO | 2017189354 A1 | | 11/2017 |
| WO | 2018013238 A1 | | 1/2018 |
| WO | 2018017920 A1 | | 1/2018 |
| WO | 2018029362 A1 | | 2/2018 |

OTHER PUBLICATIONS

"Beam Management for NR", Qualcomm, Hangzhou, P.R. China, May 2017, 3GPP TSG-RAN1 #89, R1-1708586, 9 pages.
"Use of Polarized MIMO for NR", ETRI, Nanjing, China, May 2016, 3GPP TSG RAN WG1 Meeting #85, R1-164873, 6 pages.
Ohyun Jo, et al., "Exploitation of Dual-Polarization Diversity for 5G Millimeter-Wave MIMO Beamforming Systems", IEEE Transactions on Antennas and Propagation, Dec. 2017, vol. 65, No. 12, pp. 6646-6655.
Notice of Allowance from corresponding Japanese Application No. 2020-554111 dated Jan. 4, 2022, 4 pages.
International Search Report and Written Opinion from corresponding International Application No. PCT/US2019/024264 dated Jul. 12, 2019, 16 pages.
Office Action from corresponding Swedish Application No. 1830115-0, dated Dec. 3, 2018.
Office Action from corresponding Chinese Application No. 201980023451.8 dated Jul. 25, 2022.

* cited by examiner

METHOD AND APPARATUS FOR MILLIMETER-WAVE MIMO MODE SELECTION

RELATED APPLICATION DATA

This applications claims the benefit of Swedish Patent Application No. 1830115-0, filed Apr. 5, 2018, the disclosure of which is incorporated herein by reference in its entirety.

TECHNICAL FIELD OF THE INVENTION

The technology of the present disclosure relates generally to wireless communications among electronic devices in a network environment and, more particularly, to a method and apparatus for selecting MIMO mode.

BACKGROUND

Demand for data traffic on wireless communication system continues to increase. Since widespread commercialization of fourth generation (4G) wireless systems, such as a Long Term Evolution (LTE) system or an LTE-Advanced (LTE-A) system standardized by the 3rd Generation Partnership Project (3GPP), next generation wireless systems are being developed. One such system, by the 3GPP, is a fifth generation (5G) or New Radio (NR) wireless system.

To meet demand for higher data rates, wireless systems anticipate using presently unlicensed spectrum bands. High frequency bands (e.g. millimeter wave) can provide high data rates, but signal power may decrease quicker as signals propagate as compared to lower band systems. To provide a wider coverage area, beamforming techniques may be utilized at both a base station side and a user equipment (UE) side.

Polarization based MIMO (P-MIMO), also known as polarization multiplexing, can potentially double the data rate with no additional control/signaling overhead. Certain P-MIMO transmission techniques have been proposed and shown to deliver good results in favorable channel conditions, e.g., strong line of sight channel or channels with a dominant propagation direction. However, line of sight channels cannot be guaranteed in either indoor or outdoor environments, and high mobility use cases.

In view of the above, there is a need in the art for methods and devices which are able to utilize P-MIMO transmission techniques, but also maintain a reliable communication method in situations where the communication channel is unfavorable for P-MIMO transmission.

SUMMARY

The disclosed approach provides a method of operating an electronic device. The method includes determining a mode selection based on at least one of a capability of the electronic device or channel conditions of a communication channel between the electronic device and a base station. The mode selection indicates at least one of polarization based MIMO (P-MIMO) or beam MIMO (B-MIMO). The method further includes transmitting a signal to the base station to indicate a mode for communications over the communication channel according to the mode selection.

According to one aspect of the disclosure, a method of operating an electronic device in a communication network includes determining a mode selection based on channel conditions of a communication channel between the electronic device and a network node, the mode selection indicates at least one of polarization based MIMO (P-MIMO) or beam MIMO (B-MIMO); and transmitting a signal to the network node to indicate a mode for communications over the communication channel according to the mode selection. The channel conditions are determined by performing a receive beam sweep to identify a plurality of beam pairs; and identifying at least two strongest beam pairs having a same beam direction and orthogonal polarization. The mode selection is based on a determination of whether a signal strength of the at least two strongest beam pairs having the same beam direction and orthogonal polarization is greater than a signal strength of any other beam pairs by a predetermined ratio.

According to one embodiment of the method, the method further comprises determining the channel conditions of the communication channel between the electronic device and the network node.

According to one embodiment of the method, the channel conditions comprise a dominant beam direction between the network node and the electronic device.

According to one embodiment of the method, the method further includes determining at least one of a type or a location of antenna arrays on the electronic device. The signal comprises a capability indication specifying that the electronic device supports one of P-MIMO, B-MIMO, or both, wherein the capability indication is based on at least one of the type or the location of antenna arrays on the electronic device.

According to one embodiment of the method, the mode selection indicates B-MIMO.

According to one embodiment of the method, the method further includes transmitting configuration data indicating a first polarization of a first radio frequency signal and a second polarization of a second radio frequency signal.

According to one embodiment of the method, the network node is a second electronic device.

According to one embodiment of the method, determining the mode selection is further based on a capability of the electronic device.

According to another aspect of the disclosure, an electronic device includes an antenna arrangement, and a control circuit coupled to the antenna arrangement. The control circuit is configured to determine the channel conditions by performing a receive beam sweep to identify a plurality of beam pairs; and identifying at least two strongest beam pairs having a same beam direction and orthogonal polarization. The control circuit is further configured to determine a mode selection based on the channel conditions. The mode selection indicates at least one of polarization based MIMO (P-MIMO) or beam MIMO (B-MIMO). The mode selection is based on a determination of whether the signal strength of the at least two strongest beam pairs having the same beam direction and orthogonal polarization is greater than a signal strength of any other beam pairs by a predetermined ratio. The control circuit is further configured to transmit a signal to the network node to indicate a mode for communications over the communication channel according to the mode selection.

According to one embodiment of the electronic device, the control circuit is further configured to determine the channel conditions of the communication channel between the electronic device and the network node.

According to one embodiment of the electronic device, the control circuit is further configured to determine the channel conditions based on at least a dominant beam direction between the network node and the electronic device.

According to one embodiment of the electronic device, the control circuit is further configured to determine at least one of a type or a location of the antenna arrangement of the electronic device. The signal comprises a capability indication specifying that the electronic device supports one of P-MIMO, B-MIMO, or both, wherein the capability indication is based on at least one of the type or the location of antenna arrays on the electronic device.

According to one embodiment of the electronic device, the mode selection indicates B-MIMO.

According to one embodiment of the electronic device, the control circuit is further configured to transmit configuration data indicating a first polarization of a first radio frequency signal and a second polarization of a second radio frequency signal.

According to one embodiment of the electronic device, the network node is a second electronic device.

According to one embodiment of the electronic device, determining the mode selection is further based on a capability of the electronic device.

According to another aspect of the disclosure, a method of communicating with an electronic device by a network node includes performing a transmit beam sweep for a plurality of beams, wherein each beam has a unique beam ID; receiving a signal from the electronic device, the signal specifies a mode selection indicating at least one of polarization based MIMO (P-MIMO) or beam MIMO (B-MIMO), the mode selection is based on an analysis of the plurality of beams performed by the electronic device; and activating or de-activating P-MIMO based on the mode selection.

According to one embodiment of the method, activating or de-activating P-MIMO is done by Radio Resource Control (RRC) signaling.

According to one embodiment of the method, the mode selection is based on at least one of a capability of the electronic device or a channel condition of a communication channel between the network node and the electronic device.

According to one embodiment of the method, the signal comprises a capability indication from the electronic device specifying that the electronic device supports one of P-MIMO, B-MIMO, or both, wherein the capability indication is based on at least one of a type or a location of antenna arrays on the electronic device.

According to one embodiment of the method, the mode selection indicates B-MIMO.

According to one embodiment of the method, the method further includes receiving configuration data indicating a first polarization of a first radio frequency signal and a second polarization of a second radio frequency signal.

According to one embodiment of the method, the network node is a second electronic device.

According to another aspect of the disclosure, a network node in communication with an electronic device over a communication channel includes an antenna arrangement, and a control circuit coupled to the antenna arrangement. The control circuit is configured to perform a transmit beam sweep for a plurality of beams, wherein each beam has a unique beam ID, receive a request signal from the electronic device, the request signal specifies a mode selection indicating at least one of polarization based MIMO (P-MIMO) or beam MIMO (B-MIMO), the mode selection is based on an analysis of the plurality of beams by the electronic device; and activate or de-activate P-MIMO based on the mode selection.

According to one embodiment of the network node, the control circuit is further configured to activate or de-activate P-MIMO by Radio Resource Control (RRC) signaling.

According to one embodiment of the network node, the mode selection is based on at least one of a capability of the electronic device or a channel condition of the communication channel between the network node and the electronic device.

According to one embodiment of the network node, the signal comprises a capability indication from the electronic device specifying that the electronic device supports one of P-MIMO, B-MIMO, or both, wherein the capability indication is based on at least one of a type or a location of antenna arrays on the electronic device.

According to one embodiment of the network node, the mode selection indicates B-MIMO.

According to one embodiment of the network node, the control circuit is further configured to receive configuration data indicating a first polarization of a first radio frequency signal and a second polarization of a second radio frequency signal.

According to one embodiment of the network node, the network node is a second electronic device.

DETAILED DESCRIPTION OF EMBODIMENTS

Introduction

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for selecting a communication mode in a wireless network. A communication mode selection procedure may be carried out by the respective devices in an automated manner to identify a desired mode for communication between an electronic device and a base station based on the electronic device's capabilities and/or the channel conditions of the communication channel between the electronic device and the base station. The procedure described herein may allow for the high data rates associated with polarization based MIMO while preventing communication interruptions due to unfavorable channel conditions.

System Architecture

In general, Multiple Input Multiple Output communication (MIMO) is implemented in LTE and involves the use of multiple transmission layers from multiple antennas at both sides of a link. The number of layers are less or equal to the number of antennas at the side which has the least antennas. For NR or in general at higher frequencies when beamforming is used, the receiving device (e.g. electronic device) identifies beam pairs (e.g. beams as seen from the terminal that reach the base station). For MIMO in mm-wave with beamforming, the electronic device identifies the strongest beams (with different beam ID) and selects the beams which are the strongest. For 2×2 MIMO, this corresponds to selecting the two strongest beam pairs. This process is defined as beam MIMO (B-MIMO) in this context. If the electronic device is restricted to operate dual transmit streams in a single direction but at orthogonal polarization we define this as polarization MIMO (P-MIMO). P-MIMO is then a subset of B-MIMO and P-MIMO condition applies when the electronic device identifies that the two beam pairs with different IDs are arriving from the same angle but with orthogonal polarization. Embodiments disclosed herein relate to identifying that the two strongest beam pairs actually are the same beam direction but with orthogonal polarization, communicating this between the two nodes (e.g. base station and electronic device or a first electronic device and a second electronic device) and thereby reducing the number of beam management processes. This results in the benefit of a reduction in related signaling and latency.

Figure 1:
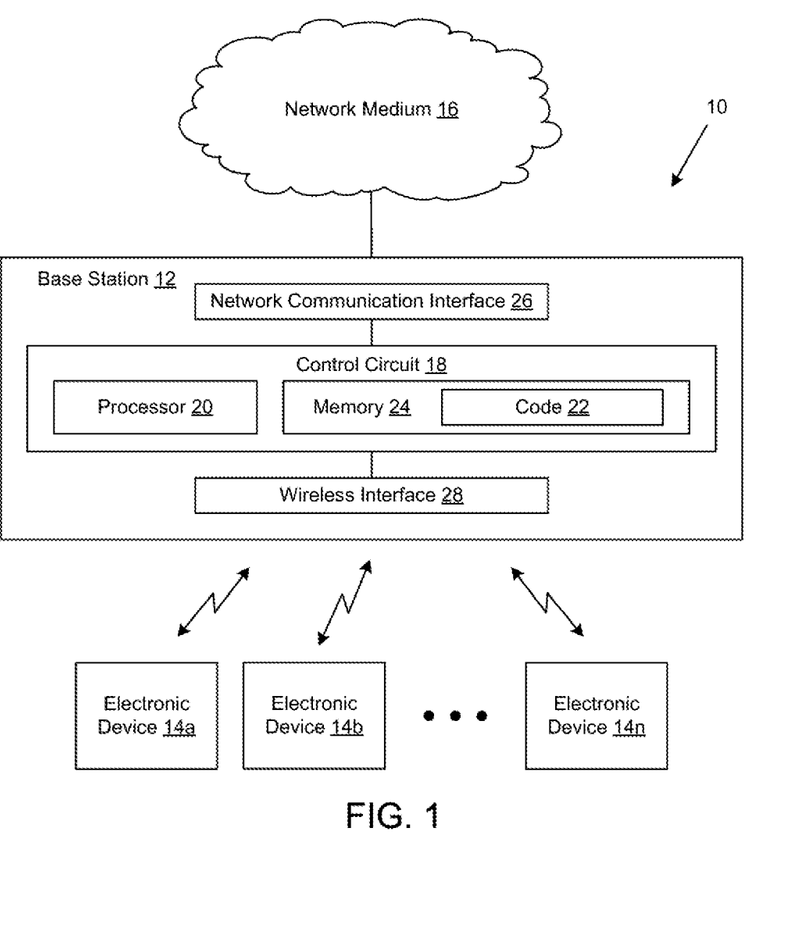
FIG. 1 is a schematic block diagram of a network system that utilizes MIMO mode selection for multi-beam wireless radio communications.

FIG. 1 is a schematic diagram of an exemplary network system 10 for implementing the disclosed techniques. It will be appreciated that the illustrated system is representative and other systems may be used to implement the disclosed techniques. The exemplary network system 10 includes a base station 12 that operates in accordance with a cellular protocol, such as a protocol promulgated by 3GPP or another standard. For instance, the network system 10 may operate in accordance with LTE, LTE-A, or a 5G NR standards. However, it is to be appreciated that the techniques described herein can be applied to substantially any wireless communication system that utilizes MIMO or multiple beams between respective devices.

The network system 10 of the illustrated example supports cellular-type protocols, which may include circuit-switched network technologies and/or packet-switched network technologies. The network system 10 includes a base station 12 that services one or more electronic devices 14, designated as electronic devices 14a through 14n in FIG. 1. The base station 12 may support communications between the electronic devices 14 and a network medium 16 through which the electronic devices 14 may communicate with other electronic devices 14, servers, devices on the Internet, etc. The base station 12 may be an access point, an evolved NodeB (eNB) in a 4G network or a next generation NodeB (gNB) in a 5G or NR network as well as a second terminal (e.g. device to device communications). As utilized herein, the term "base station" may refer, generally, to any device that services user devices and enables communications between the user devices and the network medium or a second device and, thus, includes the specific examples above depending on the network implementation. It should be appreciated that while the term "base station" is used with regards to embodiments disclosed herein, the electronic device may communicate with any type of network node according to the disclosed embodiments, including, but not limited to, a second electronic device or a different type of network element.

In one embodiment, the network system 10 supports multi-beam operations between the base station 12 and the electronic devices 14 such that the base station 12 can transmit using a plurality of beams (generated with beamforming techniques, for example) and the electronic devices 14 can receive using one or more reception beams. During multi-beam operations, the base station 12 may retransmit certain messages (with or without differences) using each available transmit beam, which is referred to as beam sweeping. In particular, such beam sweeping may occur when the base station 12 communicates information to electronic devices 14 before establishing a specific, known beam for each electronic device 14. For example, beam sweeping may be used to dynamically determine whether channel conditions are favorable for polarized MIMO (P-MIMO) communications, or whether beam MIMO (B-MIMO) should be used.

The base station 12 may include operational components for carrying out the wireless communications, the communication mode selection described herein and other functions of the base station 12. For instance, the base station 12 may include a control circuit 18 that is responsible for overall operation of the base station 12, including controlling the base station 12 to carry out the operations described in greater detail below. The control circuit 18 includes a processor 20 that executes code 22, such as an operating system and/or other applications. The functions described in this disclosure document may be embodied as part of the code 22 or as part of other dedicated logical operations of the base station 12. The logical functions and/or hardware of the base station 12 may be implemented in other manners depending on the nature and configuration of the base station 12. Therefore, the illustrated and described approaches are just examples and other approaches may be used including, but not limited to, the control circuit 18 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 22 and any stored data (e.g., data associated with the operation of the base station 12) may be stored on a memory 24. The code may be embodied in the form of executable logic routines (e.g., a software program) that is stored as a computer program product on a non-transitory computer readable medium (e.g., the memory 24) of the base station 12 and is executed by the processor 20. The functions described as being carried out by the base station 12 may be thought of as methods that are carried out by the base station 12.

The memory 24 may be, for example, one or more of a buffer, a flash memory, a hard drive, a removable media, a volatile memory, a non-volatile memory, a random access memory (RAM), or other suitable device. In a typical arrangement, the memory 24 includes a non-volatile memory for long term data storage and a volatile memory that functions as system memory for the control circuit 18. The memory 24 is considered a non-transitory computer readable medium.

The base station 12 includes communications circuitry that enables the base station 12 to establish various communication connections. For instance, the base station 12 may have a network communication interface 26 to communicate with the network medium 16. Also, the base station 12 may have a wireless interface 28 over which wireless communications are conducted with the electronic devices 14, including the multi-beam operations and procedures described herein. The wireless interface 28 may include a radio circuit having one or more radio frequency transceivers (also referred to as a modem), one or more antenna assemblies, and any appropriate tuners, impedance matching circuits, and any other components needed for the various supported frequency bands and radio access technologies.

The electronic devices 14 serviced by the base station 12 may be user devices (also known as user equipment or UEs) or machine-type devices. Exemplary electronic devices 14 include, but are not limited to, mobile radiotelephones ("smartphones"), tablet computing devices, computers, a device that uses machine-type communications, machine-to-machine (M2M) communications or device-to-device (D2D) communication (e.g., a sensor, a machine controller, an appliance, etc.), a camera, a media player, or any other device that conducts wireless communications with the base station 12.

Figure 2:
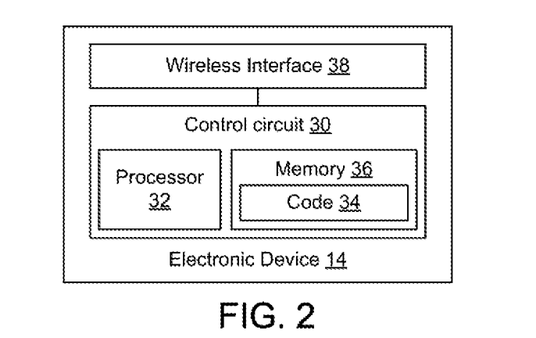
FIG. 2 is a schematic block diagram of communication device that forms part of the network system of FIG. 1.

As shown in FIG. 2, each electronic device 14 may include operational components for carrying out the wireless communications, the communication mode selection described herein and other functions of the electronic device 14. For instance, among other components, each electronic device 14 may include a control circuit 30 that is responsible for overall operation of the electronic device 14, including controlling the electronic device 14 to carry out the operations described in greater detail below. The control circuit 30 includes a processor 32 that executes code 34, such as an operating system and/or other applications. The functions described in this disclosure document may be embodied as part of the code 34 or as part of other dedicated logical operations of the electronic device 14. The logical functions and/or hardware of the electronic device 14 may be implemented in other manners depending on the nature and configuration of the electronic device 14. Therefore, the illustrated and described approaches are just examples and other approaches may be used including, but not limited to, the control circuit 30 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 34 and any stored data (e.g., data associated with the operation of the electronic device 14) may be stored on a memory 36. The code 34 may be embodied in the form of executable logic routines (e.g., a software program) that is stored as a computer program product on a non-transitory computer readable medium (e.g., the memory 36) of the electronic device 14 and is executed by the processor 32. The functions described as being carried out by the electronic device 14 may be thought of as methods that are carried out by the electronic device 14.

The memory 36 may be, for example, one or more of a buffer, a flash memory, a hard drive, a removable media, a volatile memory, a non-volatile memory, a random access memory (RAM), or other suitable device. In a typical arrangement, the memory 36 includes a non-volatile memory for long term data storage and a volatile memory that functions as system memory for the control circuit 30. The memory 36 is considered a non-transitory computer readable medium.

The electronic device 14 includes communications circuitry that enables the electronic device 14 to establish various communication connections. For instance, the electronic device 14 may have a wireless interface 38 over which wireless communications are conducted with the base station 12, including the multi-beam operations and procedures described herein. The wireless interface 38 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the electronic device 14 may include, but are not limited to, user inputs (e.g., buttons, keypads, touch surfaces, etc.), a display, a microphone, a speaker, a camera, a sensor, a jack or electrical connector, a rechargeable battery and power supply unit, a SIM card, a motion sensor (e.g., accelerometer or gyro), a GPS receiver, and any other appropriate components.

Procedures for Selecting MIMO Mode

Figure 3:
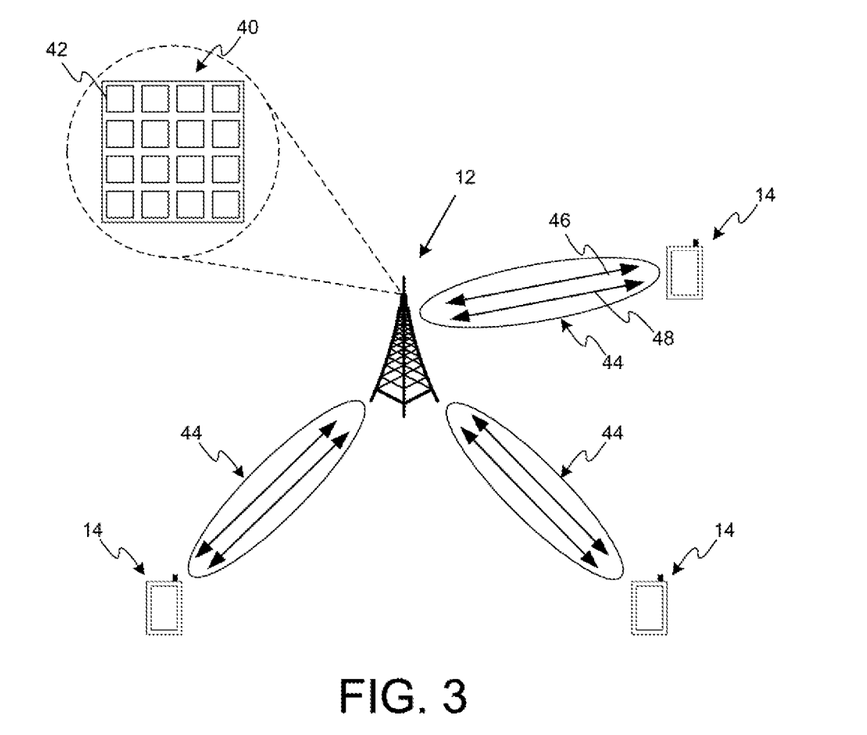
FIG. 3 is a schematic diagram of the network system of FIG. 1 according to an aspect.

With reference to FIG. 3, network system 10 may support multi-beam operations. Base station 12 may include a large antenna array 40 comprising individual antenna elements 42. In an aspect, each antenna element 42 may be coupled to a respective radio chain of base station 12. The base station 12 may use beam forming technique with the antenna array 40 to generate a plurality of transmit beams 44 directed to electronic devices 14. In certain embodiments, base station 12 may have the capabilities to operate as a polarization based MIMO (P-MIMO) system in which the transmit beams 44 are dual polarized signals. More specifically, the individual beams 46 and 48 of a beam pair in a P-MIMO system can have orthogonal polarizations with respect to one another. For example, if beam pair 44 is transmitted in a P-MIMO system, first beam 46 is transmitted in the same direction, but with a polarization that is orthogonal to the polarization of second beam 48.

In order to effectively communicate using a P-MIMO configuration, the electronic device 14 must support such configuration. Further, the electronic device 14 can predict communication channel conditions of the communication channel between the base station and the electronic device 14 in order to determine whether P-MIMO communication is feasible or desirable.

Figure 4:
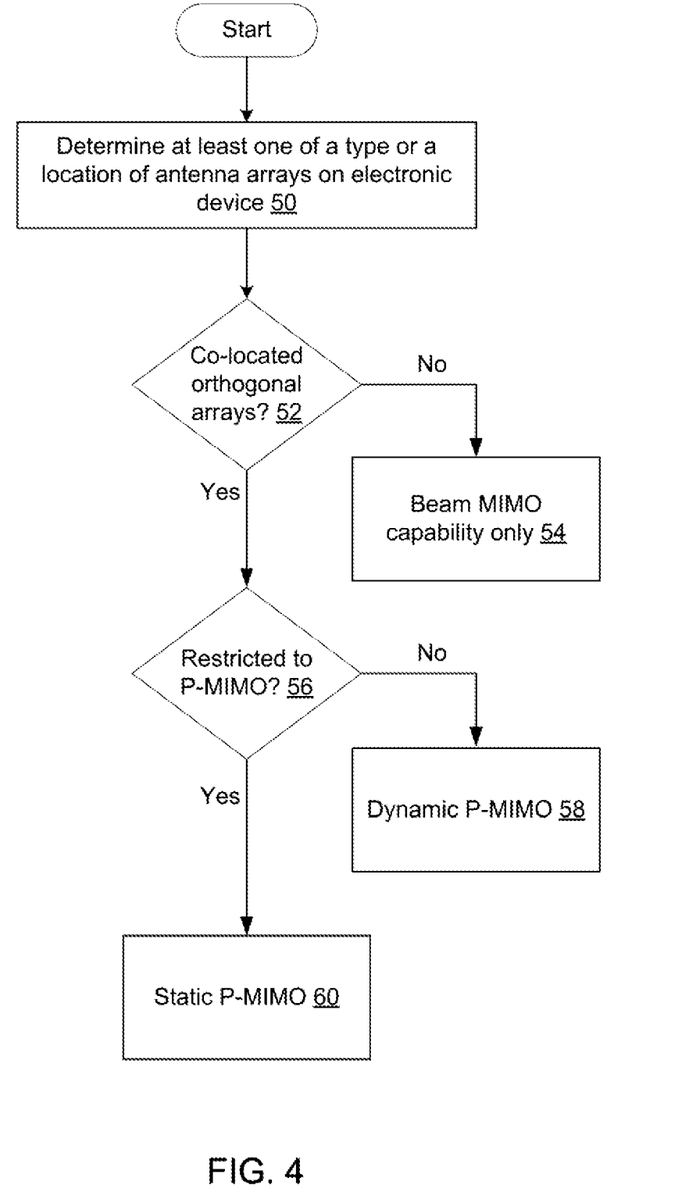
FIG. 4 is a flowchart of a method according to various examples.

With reference to FIG. 4, shown is an exemplary flow diagram representing steps that may be carried out by the electronic device 14 when executing logical instructions to carry out MIMO mode selection. The flow diagram depicts an exemplary method for determining whether an electronic device 14 supports a P-MIMO configuration. Although illustrated in a logical progression, the blocks of FIG. 4 may be carried out in other orders and/or with concurrence between two or more blocks. Therefore, the illustrated flow diagrams may be altered (including omitting steps or adding steps not shown in order to enhance description of certain aspects) and/or may be implemented in an object-oriented manner or in a state-oriented manner.

Beginning at block 50, the electronic device 14 determines at least one of a type, an amount, or a location of antenna arrays included as part of wireless interface 38. For example, the electronic device 14 may determine that its wireless interface 38 includes co-located orthogonal antenna arrays. In another example, the electronic device 14 may determine that its wireless interface 38 includes an arbitrary number of antenna arrays or antenna arrays in an arbitrary location on the electronic device 14. At block 52, electronic device 14 considers whether it has co-located orthogonal arrays. If electronic device 14 does not have co-located orthogonal arrays, electronic device 14 indicates that it has B-MIMO capability only at block 54. If electronic device 14 has co-located orthogonal arrays, electronic device 14 considers at block 56 whether it is configured to be restricted to P-MIMO only. If electronic device 14 is not restricted to P-MIMO only, electronic device 14 indicates, at block 58, that it has dynamic P-MIMO capabilities. An electronic device 14 having dynamic P-MIMO capabilities may choose to alternate operation between P-MIMO and B-MIMO. In certain embodiments, the electronic device 14 with dynamic P-MIMO capabilities may request either P-MIMO or B-MIMO depending on estimated or determined communication channel conditions as described later in reference to FIGS. 5-7. If the electronic device 14 is configured to be restricted to P-MIMO only, the electronic device 14 indicates that it has static P-MIMO capabilities at block 60. If the electronic device 14 has static P-MIMO capabilities, it may only operate using P-MIMO communications. In certain embodiments, the electronic device 14 with static P-MIMO capabilities operates using P-MIMO communications regardless of the communication channel conditions. When the electronic device 14 communicates to the base station 12 that it supports P-MIMO as a capability, it can also specify whether it has the capability or configuration to communicate with P-MIMO in the up-link direction, down-link direction, or both.

Figure 5:
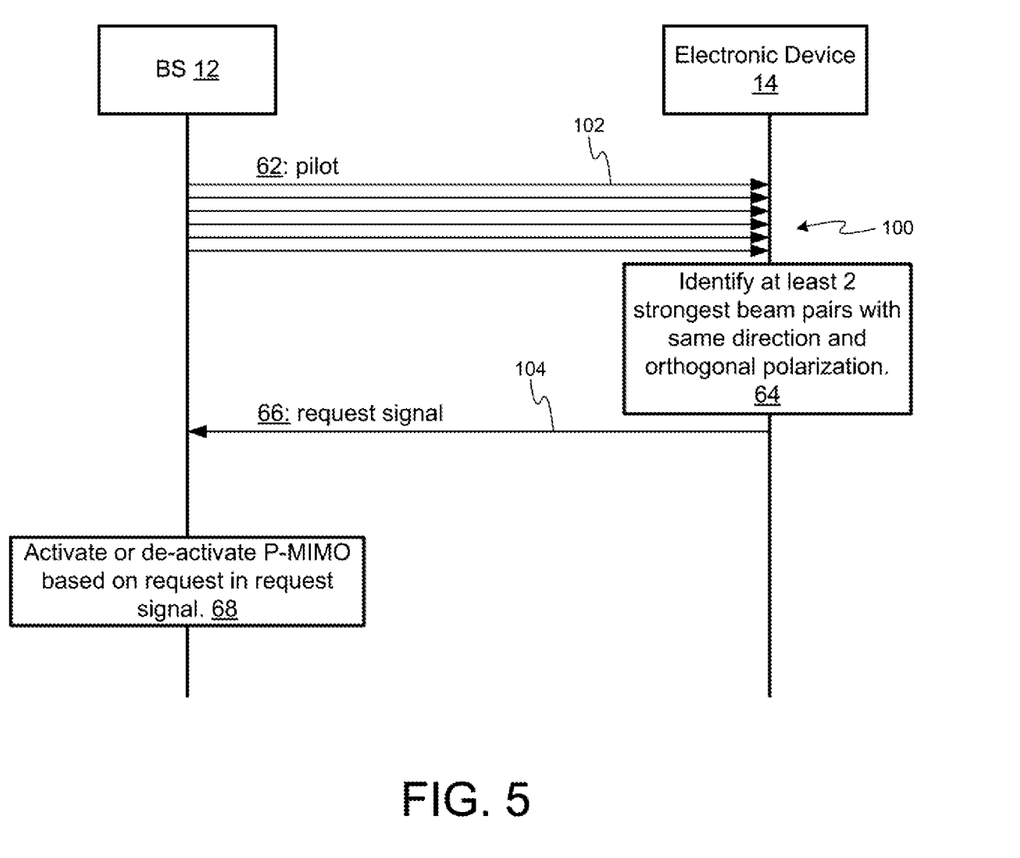
FIG. 5 is a signaling diagram associated with a beam sweep according to various examples.

Turning now to FIG. 5, an electronic device 14 may estimate channel conditions based on a beam sweep 100 performed by a base station 12. FIG. 5 is a signaling diagram of communication between the base station 12 and the electronic device 14 on a wireless communication channel. At 62, the base station 12 performs a beam sweep 100 by transmitting one or more pilot signals 102. Each pilot signal 102 may be indicative of the particular beam on which it has been transmitted. Thereby, the electronic device 14 can receive the beam sweep 100 and identify the particular beams of the beam sweep 100 which shows most favorable transmission characteristics. In certain embodiments where the base station 12 includes omni-directional antennas, the communication channel is sounded by pilot signals (e.g. Channel State Information-Reference Signals (CSI-RS) in the down-link case and Sounding Reference Signal (SRS) in the up-link case). A pilot signal is transmitted from each antenna element on the base station 12 in a dedicated time frequency resource and received by all antennas at the receive side (e.g. electronic device 14). The receiver node then has the full channel matrix. By computing a singular value decomposition (SVD), the modes associated with the strongest singular values can be identified and addressed by the electronic device 14 with different streams. If the electronic device 14 identifies that two singular values are associated with the same directional properties it can conclude that they are orthogonally polarized. If the two strongest singular values are identified as being orthogonal from polarization perspective the electronic device 14 can assume that P-MIMO condition apply.

In certain embodiments, pilot signals 102 are transmitted by the base station 12 in beams as described above. Transmit beam sweeps are performed by the base station 12 where each beam has a unique beam ID. The electronic device 14 performs a receive beam sweep and identifies beam pairs. In some embodiments, an electronic device 14 with collocated dual polarized antennas sweeps both polarizations independently. Likewise, the base station 12 can sweep both polarizations independently. It should be appreciated that the polarizations at the base station 12 are not necessarily aligned to the polarizations at the electronic device 14. As the electronic device 14 knows which receive beams correspond to the same direction, but with different polarization, it can detect if P-MIMO conditions apply also in this case.

At 64, the electronic device 14 identifies at least two strongest beam pairs having the same beam direction and orthogonal polarization. The electronic device 14 can determine whether the signal strength of the at least two strongest beam pairs is greater than a signal strength of any other beam pairs by a predetermined ratio. The electronic device 14 then selects a communication mode based on the determination of whether the signal strength of the at least two strongest orthogonally polarized beam pairs is greater than a signal strength of any two other beam pairs by the predetermined ratio. If the signal strength of the at least two strongest orthogonally polarized beam pairs is greater than a signal strength of any two of the other beam pairs in the beam sweep 100 by the predetermined ratio, then the electronic device 14 can determine that P-MIMO conditions apply on the communication channel. In this situation, the electronic device 14 indicates a request for P-MIMO communications and transmits this request via a request signal 104 to the base station 12 at 66. At 68, upon receiving the request signal 104, the base station 12 can activate or de-activate P-MIMO communications based on the request indicated by the electronic device 14 in the request signal 104.

Figure 6:
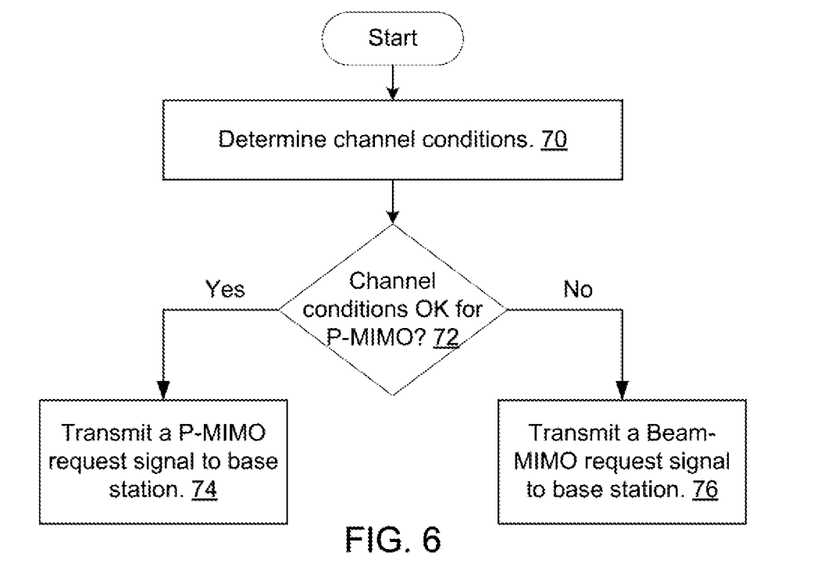
FIG. 6 is a flowchart of a method according to various examples.
Figure 7:
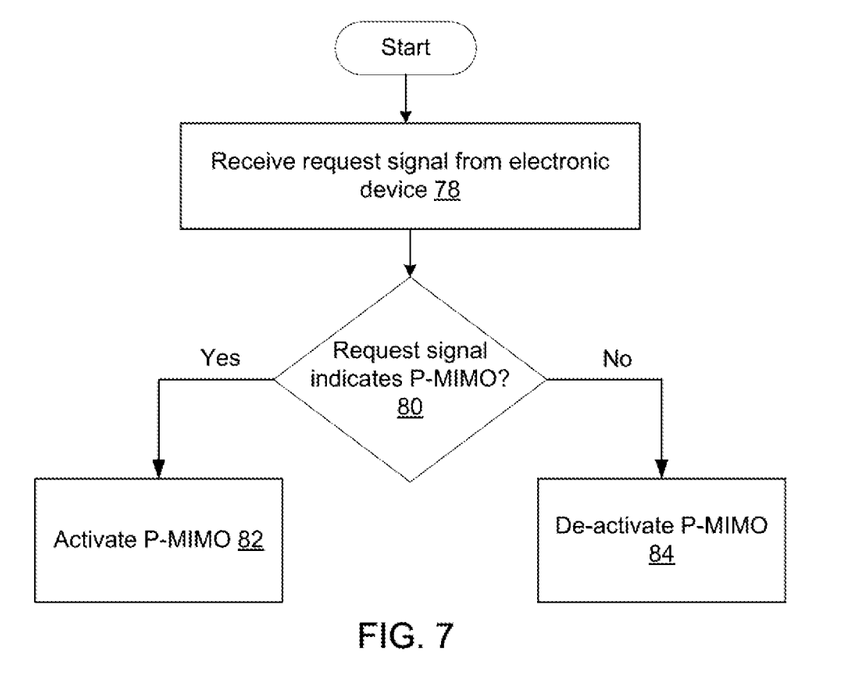
FIG. 7 is a flowchart of a method according to various examples.

With reference to FIG. 6, shown is an exemplary flow diagram representing steps that may be carried out by the electronic device 14 when executing logical instructions to determine channel conditions and/or select a communication mode. Complimentary operations of the base station 12 are shown in FIG. 7, which shows an exemplary flow diagram representing steps that may be carried out by the base station 12 when executing logical instructions to carry out activation or deactivation of P-MIMO communications. Although illustrated in a logical progression, the blocks of FIGS. 6 and 7 may be carried out in other orders and/or with concurrence between two or more blocks. Therefore, the illustrated flow diagrams may be altered (including omitting steps or adding steps not shown in order to enhance description of certain aspects) and/or may be implemented in an object-oriented manner or in a state-oriented manner. Also, the method represented by FIG. 6 may be carried out apart from the method of FIG. 7 and vice versa.

Turning first to FIG. 6, at block 70, the electronic device 14 determines or estimates communication channel conditions. This step may include some or all of the steps of the beam sweep and analysis operations described above with respect to FIG. 5. Determining channel conditions can also include determining whether there is line of sight, a dominant mode, a dominant beam direction, or multiple available modes between the base station 12 and the electronic device 14. At 72, the electronic device 14 determines whether the communication channel conditions are acceptable for P-MIMO communications. If the channel conditions are acceptable for P-MIMO, the electronic device 14 transmits a P-MIMO request signal to base station 12 at block 74. For example, the electronic device 14 can determine that channel conditions are acceptable for P-MIMO if the receive beam sweep 100 analysis indicates P-MIMO conditions on the communication channel and/or if there is a line of sight, or dominant mode between the base station 12 and the electronic device 14. If the channel conditions are unacceptable or not conducive for P-MIMO, the electronic device 14 transmits a B-MIMO request signal to the base station 12 at block 76. For example, the electronic device 14 can determine that channel conditions are not acceptable for P-MIMO if the receive beam sweep 100 analysis indicates that P-MIMO conditions are not present on the communication channel and/or if there is no line of sight between the base station 12 and the electronic device 14. After sending a request for B-MIMO, the electronic device 14 can transmit configuration data indicating a first polarization of a first radio frequency signal and a second polarization of a second radio frequency signal to be transmitted as a beam pair by the base station 12. Alternatively, the electronic device 14 may also request Single Input Single Output (SISO) communications when the communication channel does not support more than a single stream.

Turning now to FIG. 7, at block 78, the base station 12 receives the request signal from the electronic device 14. At block 80, the base station 12 determines whether the request signal indicates P-MIMO. If the request signal indicates P-MIMO, the base station 12 activates P-MIMO at block 82. If the request signal does not indicate P-MIMO, the base station 12 de-activates P-MIMO at block 84 (or maintains B-MIMO if P-MIMO is already de-activated.) In certain embodiments, the base station 12 can activate or de-activate P-MIMO by Radio Resource Control (RRC) signaling. Further, the base station 12 can activate P-MIMO in the up-link direction, the down-link direction, or both, based on the electronic device's 14 request.

In certain embodiments, the base station 12 activates or de-activates P-MIMO based only on the capabilities of the electronic device 14, as described with regards to FIG. 4. In these embodiments, the electronic device 14 transmits a signal to the base station indicating the electronic device's 14 capabilities with regards to communication via P-MIMO, and the base station 12 responds by activating or de-activating P-MIMO based on the device's capabilities and/or configuration.

In other embodiments, the base station 12 activates or de-activates P-MIMO based only on communication channel conditions as estimated or determined by the electronic device 14, as described with regards to FIGS. 5-7. The electronic device 14 transmits a signal to the base station indicating whether the channel conditions support P-MIMO communications, and the base station 12 responds by activating or de-activating P-MIMO based on the communication channel conditions.

In still other embodiments, the base station 12 activates or de-activates P-MIMO based on both the capabilities of the electronic device 14 (e.g. in FIG. 4) and the communication channel conditions (e.g. in FIGS. 5-7). The electronic device 14 transmits a signal to the base station indicating the electronic device's 14 capabilities with regards to communication via P-MIMO. If the electronic device 14 has P-MIMO capabilities, it also communicates an indication whether the channel conditions support P-MIMO communications, and the base station 12 responds by activating or de-activating P-MIMO based on the electronic device's 14 capabilities and the communication channel conditions.

In further embodiments, if P-MIMO feature is activated, a decision is made regarding whether beams corresponding to the same physical antenna element but different polarization should or should not be in the same beam group. More specifically, the decision is whether the beam IDs of the polarization pair should or should not be in the same beam group. This decision depends on whether multiplexing MIMO is allowed with beams in the same beam group.

The embodiments disclosed herein may also apply to larger scale MIMO where each dual polarized beam pair has a common beam management process.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method of operating an electronic device in a communication network, comprising:
   determining a mode selection based on channel conditions of a communication channel between the electronic device and a network node, the mode selection indicates at least one of polarization based MIMO (P-MIMO) or beam MIMO (B-MIMO); and
   transmitting a signal to the network node to indicate a mode for communications over the communication channel according to the mode selection, wherein the channel conditions are determined by:
   performing a receive beam sweep to identify a plurality of beam pairs; and
   identifying at least two strongest beam pairs having a same beam direction and orthogonal polarization;
   comparing the at least two strongest beam pairs having the same beam direction and orthogonal polarization to other beam pairs of the plurality of beam pairs to determine whether the at least two strongest beam pairs having the same beam direction and orthogonal polarization have a signal strength greater than a signal strength of any of the other beam pairs by a predetermined ratio;
   wherein the mode selection is based on the determination of whether the signal strength of the at least two strongest beam pairs having the same beam direction and orthogonal polarization is greater than the signal strength of any of the other beam pairs by the predetermined ratio.

2. The method of claim 1, further comprising:
   determining the channel conditions of the communication channel between the electronic device and the network node.

3. The method of claim 2, wherein the channel conditions comprise a dominant beam direction between the network node and the electronic device.

4. The method of claim 1, further comprising:
   determining at least one of a type or a location of antenna arrays on the electronic device;
   wherein the signal comprises a capability indication specifying that the electronic device supports one of P-MIMO, B-MIMO, or both, wherein the capability indication is based on at least one of the type or the location of antenna arrays on the electronic device.

5. The method of claim 1, wherein the mode selection indicates B-MIMO.

6. The method of claim 5, further comprising:
   transmitting configuration data indicating a first polarization of a first radio frequency signal and a second polarization of a second radio frequency signal.

7. The method of claim 1, wherein determining the mode selection is further based on a capability of the electronic device.

8. An electronic device comprising:
   an antenna arrangement, and
   a control circuit coupled to the antenna arrangement, the control circuit configured to:

determine channel conditions of a communication channel between the electronic device and a network node by:
  performing a receive beam sweep to identify a plurality of beam pairs; and
  identifying at least two strongest beam pairs having a same beam direction and orthogonal polarization;
determine a mode selection based on the channel conditions, the mode selection indicates at least one of polarization based MIMO (P-MIMO) or beam MIMO (B-MIMO), wherein the mode selection is based on a comparison of the at least two strongest beam pairs having the same beam direction and orthogonal polarization to other beam pairs of the plurality of beam pairs, wherein the comparison results in a determination of whether a signal strength of the at least two strongest beam pairs having the same beam direction and orthogonal polarization is greater than a signal strength of any of the other beam pairs by a predetermined ratio; and
transmit a signal to the network node to indicate a mode for communications over the communication channel according to the mode selection.

9. The electronic device of claim 8, wherein the control circuit is configured to determine the channel conditions based on at least a dominant beam direction between the network node and the electronic device.

10. The electronic device of claim 8, wherein the control circuit is further configured to:
  determine at least one of a type or a location of the antenna arrangement of the electronic device;
  wherein the signal comprises a capability indication specifying that the electronic device supports one of P-MIMO, B-MIMO, or both, wherein the capability indication is based on at least one of the type or the location of antenna arrays on the electronic device.

11. The electronic device of claim 8, wherein the mode selection indicates B-MIMO.

12. The electronic device of claim 11, wherein the control circuit is further configured to:
  transmit configuration data indicating a first polarization of a first radio frequency signal and a second polarization of a second radio frequency signal.

13. The method of claim 8, wherein determining the mode selection is further based on a capability of the electronic device.

14. A method of communicating with an electronic device by a network node, comprising:
  performing a transmit beam sweep for a plurality of beams, wherein each beam has a unique beam ID;
  receiving a signal from the electronic device, the signal specifies a mode selection indicating at least one of polarization based MIMO (P-MIMO) or beam MIMO (B-MIMO), wherein the mode selection is based on an analysis of the plurality of beams performed by the electronic device, and the analysis includes a comparison of at least two strongest beam pairs having a same beam direction and orthogonal polarization to other beam pairs of the plurality of beams, wherein the comparison results in a determination of whether a signal strength of the at least two strongest beam pairs having the same beam direction and orthogonal polarization is greater than a signal strength of any of the other beam pairs by a predetermined ratio; and
  activating or de-activating P-MIMO based on the mode selection.

15. The method of claim 14, wherein activating or de-activating P-MIMO is done by Radio Resource Control (RRC) signaling.

16. The method of claim 14, wherein the mode selection is based on at least one of a capability of the electronic device or a channel condition of a communication channel between the network node and the electronic device.

17. The method of claim 14, wherein the signal comprises a capability indication from the electronic device specifying that the electronic device supports one of P-MIMO, B-MIMO, or both, wherein the capability indication is based on at least one of a type or a location of antenna arrays on the electronic device.

18. The method of claim 14, wherein the mode selection indicates B-MIMO, and the method further comprises:
  receiving configuration data indicating a first polarization of a first radio frequency signal and a second polarization of a second radio frequency signal.

19. The method of claim 14, wherein the network node is a second electronic device.

20. A network node in communication with an electronic device over a communication channel, the network node comprising:
  an antenna arrangement, and
  a control circuit coupled to the antenna arrangement, wherein the control circuit configures the network node to carry out the method according to claim 14.

* * * * *